US012715491B2

(12) United States Patent
Sun

(10) Patent No.: US 12,715,491 B2
(45) Date of Patent: Aug. 25, 2026

(54) TRIPLE-CROSSED HORIZONTAL FOLDING CART

(71) Applicant: Zhejiang Pride Leisure Products Co,. Ltd., Jinhua (CN)

(72) Inventor: Benlong Sun, Jinhua (CN)

(73) Assignee: ZHEJIANG PRIDE LEISURE PRODUCTS CO., LTD., Zhejiang Province (CN)

( * ) Notice: Subject to any disclaimer, the term of this patent is extended or adjusted under 35 U.S.C. 154(b) by 443 days.

(21) Appl. No.: 18/338,317

(22) Filed: Jun. 20, 2023

(65) Prior Publication Data

US 2023/0406384 A1 Dec. 21, 2023

(30) Foreign Application Priority Data

Jun. 20, 2022 (CN) ......................... 202210697059.5

(51) Int. Cl.
*B62B 3/02* (2006.01)
*B62B 3/00* (2006.01)
*B62B 5/06* (2006.01)

(52) U.S. Cl.
CPC ................ *B62B 3/02* (2013.01); *B62B 3/002* (2013.01); *B62B 5/067* (2013.01); *B62B 2205/06* (2013.01); *B62B 2501/06* (2013.01)

(58) Field of Classification Search
CPC ........... B62B 3/02; B62B 3/002; B62B 5/067; B62B 2205/06; B62B 2501/06
See application file for complete search history.

(56) References Cited

FOREIGN PATENT DOCUMENTS

CN 214775987 U * 11/2021
DE 202014100645 U1 * 3/2014 ............... B25H 1/06

* cited by examiner

*Primary Examiner* — James A Shriver, II
(74) *Attorney, Agent, or Firm* — WPAT Law, P.C.; Anthony King

(57) ABSTRACT

A triple-crossed horizontal folding cart having a cart frame, wherein the cart frame has a frame body formed by a front wall, a rear wall, and two symmetrical side walls, and a chassis disposed at the bottom of the frame body, left and right ends of the front wall are each provided with a wheel, left and right ends of the rear wall are each provided with a wheel, and a front end and a rear end of the chassis are rotatably connected to the front wall and the rear wall respectively. Each of the side walls has a front cross tube, a middle cross tube and a rear cross tube which are rotatably connected in sequence, and two straight tubes of each said cross tube are rotatably connected.

7 Claims, 5 Drawing Sheets

TRIPLE-CROSSED HORIZONTAL FOLDING CART

BACKGROUND OF THE INVENTION

1. Technical Field

The invention belongs to the technical field of carts, and particularly relates to a triple-crossed horizontal folding cart.

2. Description of Related Art

Carts are transport vehicles pushed and pulled with manpower, can work in places where motor vehicles cannot be used because they are low in cost, easy to maintain, convenient to operate and low in weight, and thus, can transfer light articles within a short distance. Particularly, with the continuous improvement of people's living standard, carts are used for carrying articles nearby when people go out for camping or for holiday in free time after work. When people go out for holiday or buy vegetables, they often use carts to transport a large quantity of materials for activities in a short distance more conveniently. Existing folding portable carts are generally designed to be smaller to be stored and carried easily on the way. However, such small portable carts have a limited space after being unfolded, thus being relatively low in carrying capacity.

BRIEF SUMMARY OF THE INVENTION

The objective of the invention is to overcome the defects of the prior art by providing a triple-crossed horizontal folding cart, which can be unfolded horizontally to have a larger loading space through the design of three cross tubes, and can be horizontally folded when not used to occupy less space, thus being convenient and fast to use.

To fulfill the above objective, the invention adopts the following technical solution: a triple-crossed horizontal folding cart comprises a cart frame, wherein the cart frame comprises a frame body formed by a front wall, a rear wall, and two symmetrical side walls, and a chassis disposed at a bottom of the frame body, wherein left and right ends of the front wall are each provided with a wheel, left and right ends of the rear wall are each provided with a wheel, and a front end and a rear end of the chassis are rotatably connected to the front wall and the rear wall respectively; each of the side walls comprises a front cross tube, a middle cross tube and a rear cross tube which are rotatably connected in sequence, and two straight tubes of each cross tube are rotatably connected; upper and lower sides of the front cross tube are rotatably connected to the front wall and the chassis respectively, and upper and lower sides of the rear cross tube are rotatably connected to the rear wall and the chassis respectively.

Further, the front wall comprises two vertical tubes, a U-shaped upper horizontal tube and a lower horizontal tube, wherein two symmetrical bottoms of the U-shaped upper horizontal tube are riveted to the two vertical tubes respectively, and two free ends of the U-shaped upper horizontal tube are rotatably connected to upper ends of the two front cross tubes of the two side walls; the lower horizontal tube is fixed to lower ends of the two vertical tubes; and the rear wall is identical in structure with the front wall.

Further, the triple-crossed horizontal folding cart further comprises a telescopic hand lever, wherein a lower end of the hand lever is rotatably connected to the lower horizontal tube.

Further, the straight tube, connected to the chassis, of the two straight tubes of the front cross tube or the rear cross tube is a long tube, the straight tube, connected to the front wall or the rear wall, of the straight tubes of the front cross tube or the rear cross tube is a short tube, and an upper section of the long tube is riveted to the short tube.

Further, the two straight tubes of the middle cross tube are short straight tubes.

Further, the chassis comprises two bottom frames and two bottom frame connectors, wherein one side of one bottom frame and one side of the other bottom frame are riveted through the two bottom frame connectors, and the other side of one bottom frame and the other side of the other bottom frame are riveted to a lower end of the front wall and a lower end of the rear wall respectively.

Further, each bottom frame comprises a long horizontal rod, a short horizontal rod and two side rods, wherein front and rear ends of each side rod are connected to the front wall or the rear wall, and one bottom frame connector respectively; two ends of the long horizontal rod are fixed to sides, close to the front wall or the rear wall, of the two side rods respectively, and two ends of the short horizontal rod are fixed to sides, close to the bottom frame connectors, of the two side rods respectively; and two ends of the connecting rod are fixed to a middle of the long horizontal rod and a middle of the short horizontal rod respectively.

Further, each bottom frame connector comprises a U-shaped connecting piece which is open downward, and a rivet, wherein one side of the U-shaped connecting piece is disposed around and fixed at ends of the side rods of one bottom frame, through holes in a left-right direction are formed in two symmetrical walls on the other side of the U-shaped connecting piece, shaft sleeves are disposed on lower surfaces of ends of the side rods of the other bottom frame, and the rivet penetrates through the through holes and the shaft sleeves to rotatably connect the U-shaped connecting piece and the other bottom frame; when the short horizontal rod is pulled upward or downward, the ends of the side rods of the other bottom frame is separated from or inlaid in an opening of the U-shaped connecting piece, and the two bottom frames are folded or unfolded.

Further, end faces of protrusions on left and right sides of the other bottom frame are slopes, and sides, close to the U-shaped connecting piece, of the slopes are lower than sides, away from the U-shaped connecting piece, of the slopes.

Further, the wheels are detachably connected to a bottom of the front wall or a bottom of the rear wall.

Further, the triple-crossed horizontal folding cart further comprises a cart cloth cover, wherein four upper edges of the cart cloth cover are installed on the two side walls, the front wall and the rear wall of the frame body, and a bottom of the cart cloth cover is in contact with a surface of the chassis.

By adoption of the technical solution, the invention has the following beneficial effects: by means of the triple-crossed side wall structure, the horizontal length of the cart is extended, so the storage space of the cart is enlarged, more articles can be placed in the cart, thin and long articles can be placed in the cart, and the loading capacity and application range of the cart are expanded; and the whole cart is easy to fold, can be folded to be stored when carried outdoors, and occupy little space.

Figure 1:
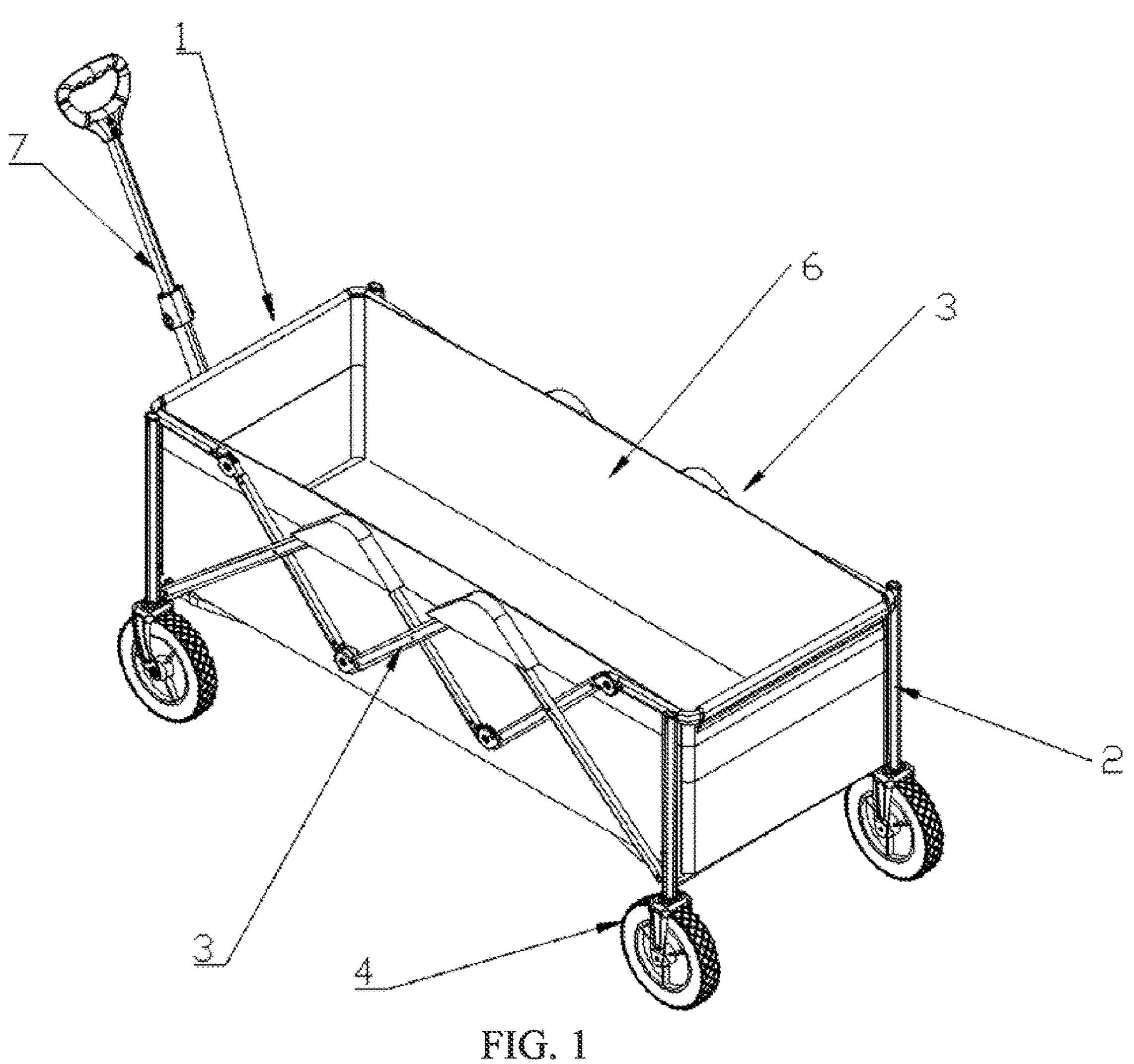
FIG. 1 is a three-dimensional view of a triple-crossed horizontal folding cart.
Figure 2:
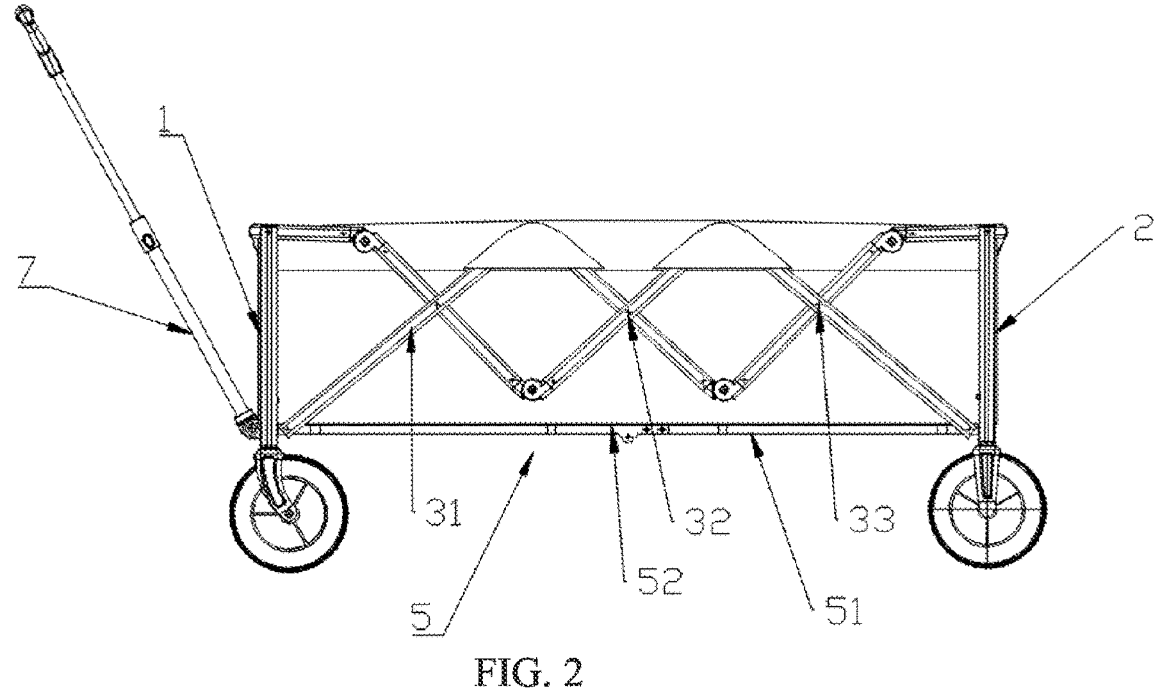
FIG. 2 is a front view of the triple-crossed horizontal folding cart.
Figure 3:
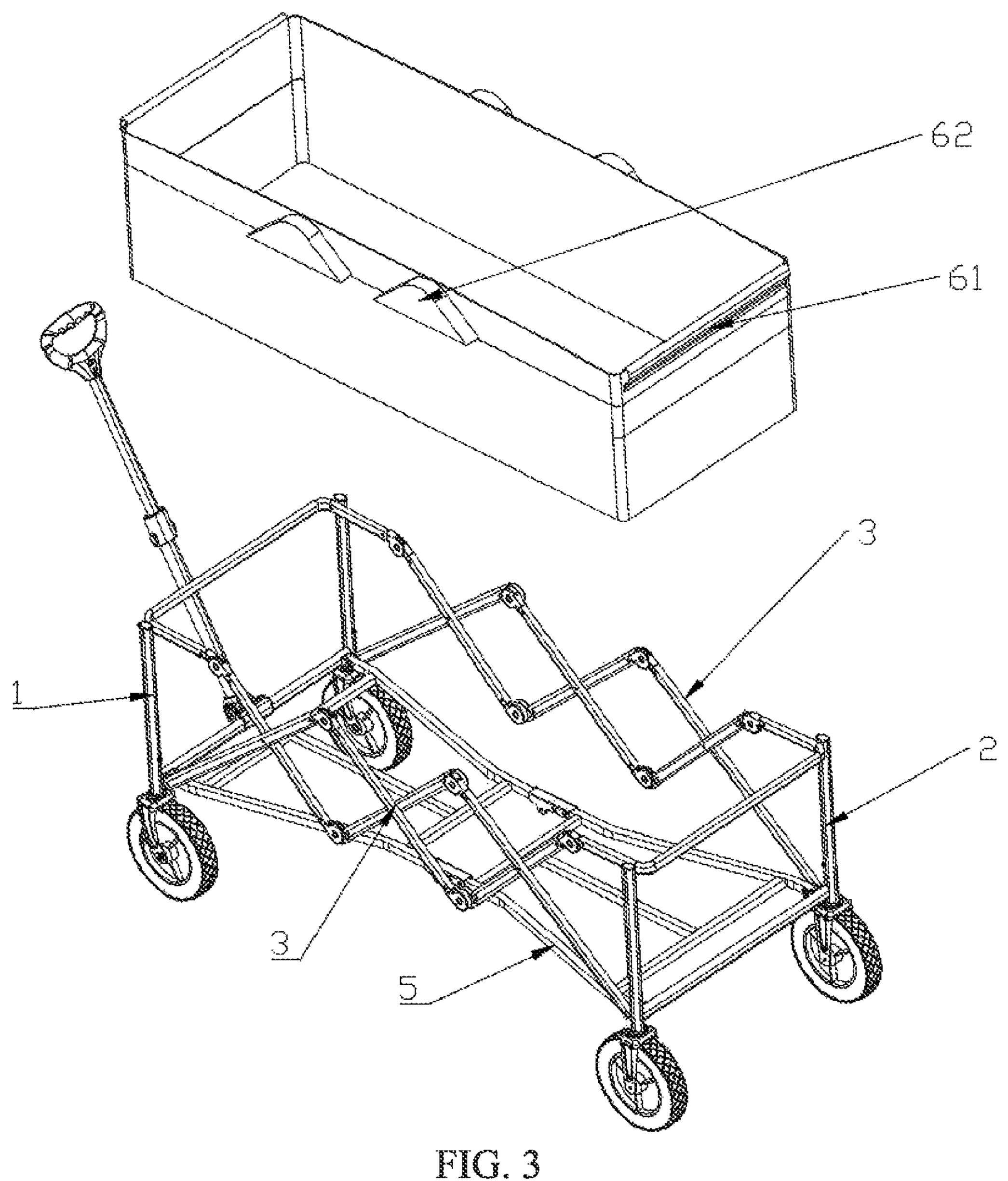
FIG. 3 is a diagram of the triple-crossed horizontal folding cart in an unfolded state.

In the figures: 1, front wall; 11, vertical tube; 12, U-shaped upper horizontal tube; 13, lower horizontal tube; 14, end cap; 2, rear wall; 3, side wall; 31, front cross tube; 311, long tube; 312, short tube; 32, middle cross tube; 321, short straight tube; 33, rear cross tube; 4, wheel; 41, wheel body; 42, wheel carrier; 43, bolt; 5, chassis; 51, bottom frame; 511, long horizontal rod; 512, short horizontal rod; 513, side rod; 5131, shaft sleeve; 5132, slope; 514, connecting rod; 52, U-shaped connecting piece; 521, through hole; 6, cart cloth cover; 61, sleeve; 62, fixing piece; 7, hand lever; 71, handle; 72, telescopic rod; 8, rotary connector, 81, circular riveting portion; 82, insert portion; 9, U-shaped fixing member.

DETAILED DESCRIPTION OF THE INVENTION

The specific embodiments of the specific solution of the invention will be further expounded below in conjunction with the accompanying drawings to gain a better understanding of the technical solution.

As shown in FIG. 1-FIG. 6, this embodiment discloses a triple-crossed horizontal folding cart, which comprises a cart frame, wherein the cart frame is composed of a frame body formed by a front wall 1, a rear wall 2 and two symmetrical side walls 3, and a chassis 5 disposed at the bottom of the frame body, left and right ends of the front wall 1 are each provided with a wheel 4, left and right ends of the rear wall 2 are each provided with a wheel 4, and a front end and a rear end of the chassis 5 are rotatably connected to the front wall 1 and the rear wall 2 respectively; each of the side walls 3 comprises a front cross tube 31, a middle cross tube 32 and a rear cross tube 33 which are rotatably connected in sequence, and two straight tubes of each cross tube are rotatably connected in an X shape; and upper and lower sides of the front cross tube 31 are rotatably connected to the front wall 1 and the chassis 5 respectively, and upper and lower sides of the rear cross tube 33 are rotatably connected to the rear wall 2 and the chassis 5 respectively.

In a specific embodiment, the front wall 1 comprises two vertical tubes 11, a U-shaped upper horizontal tube 12 and a lower horizontal tube 13, wherein two symmetrical bottoms of the U-shaped upper horizontal tube 12 are riveted to the two vertical tubes 11 respectively, and two free ends of the U-shaped upper horizontal tube 12 are rotatably connected to upper ends of the two front cross tubes 31 respectively; and the lower horizontal tube 13 is fixed to lower ends of the two vertical tubes 11. The rear wall 2 is identical in structure with the front wall 1. End caps 14 are disposed at tops of the vertical tubes 11 to prevent impurities from falling into the vertical tubes 11, and the end caps 14 may be made of plastic. In an unfolded state, the highest positions of the front wall 1, the rear wall 2 and the two side walls 3 are located on the same horizontal plane, such that a cart cloth cover 6 can be installed horizontally.

In order to move, push or pull the whole cart easily and meet different use requirements of users with different heights, the folding cart further comprises a telescopic hand lever 7, wherein a lower end of the hand lever 7 is rotatably connected to the lower horizontal tube 13 of the front wall, a handle 71 to be held by users is disposed at an upper end of the hand lever 7, a telescopic rod 72 is disposed at the lower end of the hand lever 7, and a lower end of the telescopic rod is riveted to a U-shaped connector, which is disposed in the middle of the lower horizontal tube 13 and is open forward, such that the whole hand lever 7 can rotate upward and downward with respect to the front wall 1.

The straight tube, connected to the chassis, of the two straight tubes of the front cross tube 12 or the rear cross tube 13 is a long tube 311, and the straight tube, connected to the U-shaped upper horizontal tube 12 of the front wall 1 or the rear wall 2, of the two straight tubes of the front cross tube 12 or the rear cross tube 13 is a short tube 312, and an upper section of the long tube 311 is riveted to the short tube 312. The middle cross tube 32 is composed of two short straight tubes 321.

An upper end of each straight tube of the three cross tubes is riveted to the corresponding U-shaped upper horizontal tube 12 through a rotary connector 8, or every two of the three cross tubes are riveted through a rotary connector 8. The rotary connector 8 is formed by riveting two symmetrical structures each comprising a circular riveting portion 81 and an insert portion 82, the circular riveting portions 81 of the two structures are riveted through a rivet, and the insert portion 82 at the other end of each structure is inserted into the straight tube of the corresponding cross tube or the free end of the corresponding U-shaped upper horizontal tube 12, and is fixed with a rivet.

Figure 4:
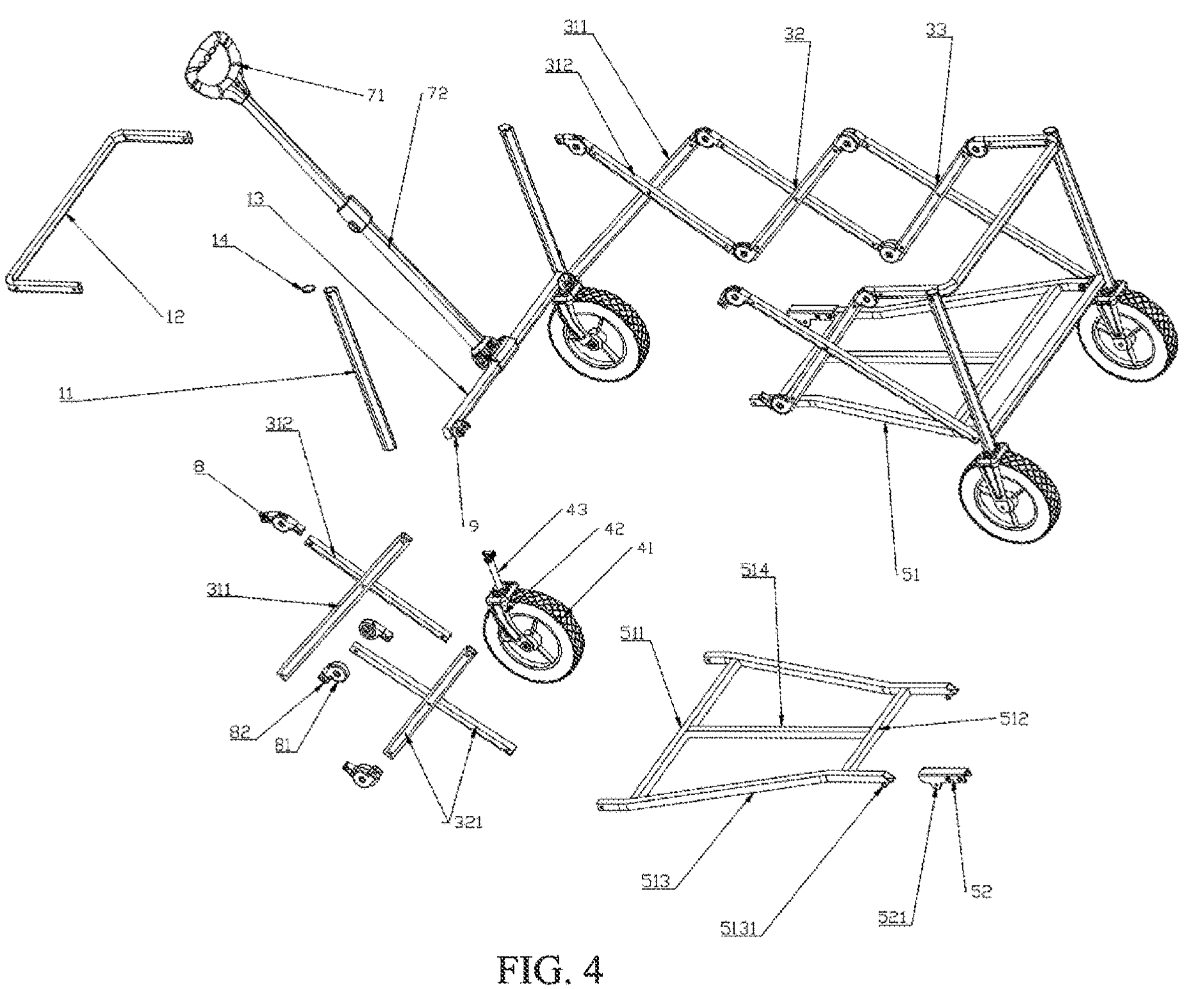
FIG. 4 is a diagram of a cart frame in a disassembled state.
Figure 5:
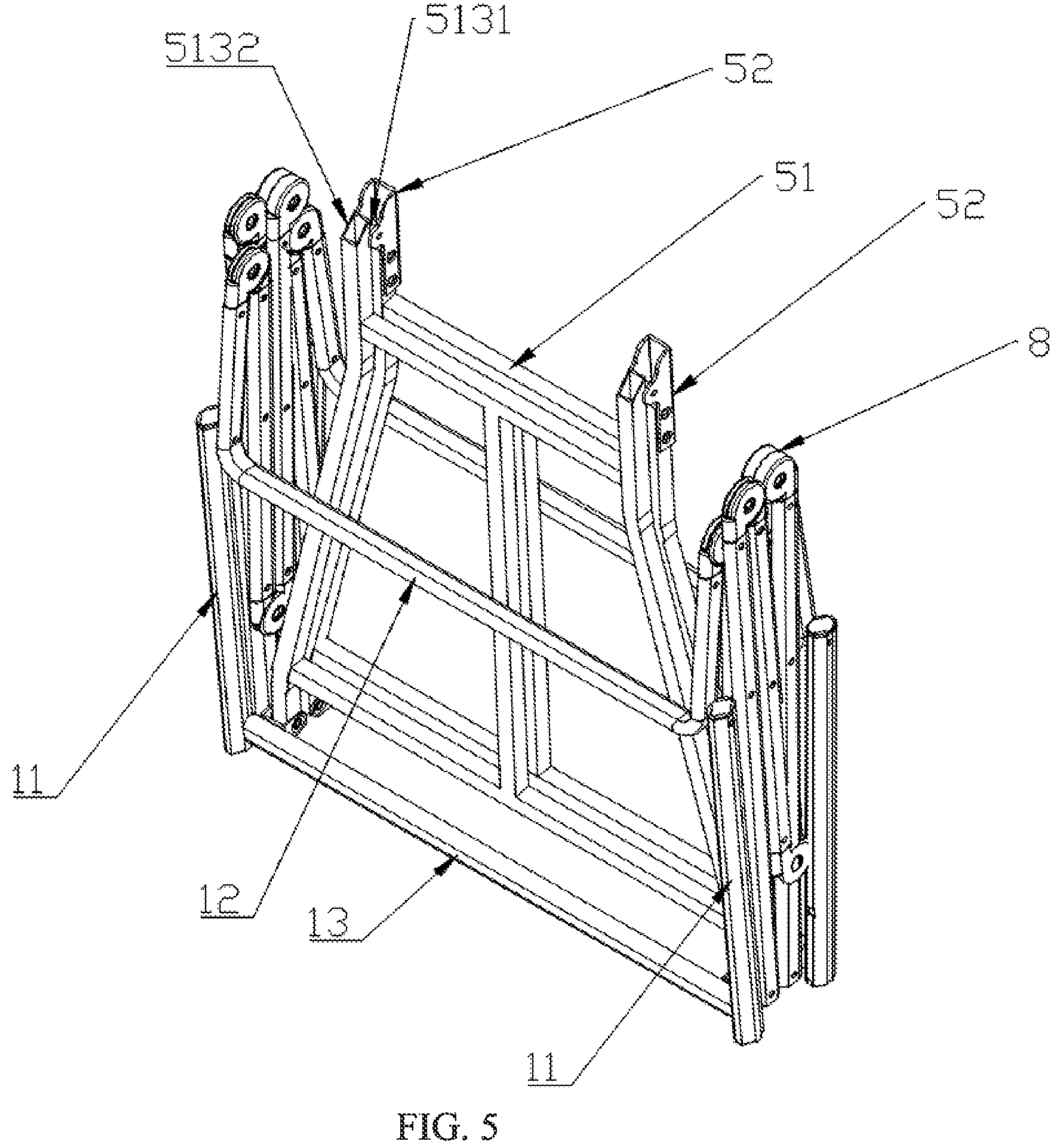
FIG. 5 is a diagram of the cart frame in a folded state.

According to one specific structure, as shown in FIG. 4-FIG. 5, the chassis 5 comprises two symmetrical bottom frames 51 and two bottom frame connectors 52, wherein a side wall of one side of one bottom frame 51 and a side wall of one side of the other bottom frame 51 are riveted through the two bottom frame connectors 52, and the other side of one bottom frame 51 and the other side of the other bottom frame 51 are riveted to a lower end of the front wall 1 and a lower end of the rear wall 2 respectively.

Each bottom frame 51 comprises a long horizontal rod 511, a short horizontal rod 512, two side rods 513 and a connecting rod 514, wherein front and rear ends of each side rod 513 are connected to the front wall 1 or the rear wall 2, and one bottom frame connector 52 respectively, two ends of the long horizontal rod 511 are fixed to sides, close to the front wall or the rear wall, of the two side rods 513 respectively, two ends of the short horizontal rod 512 are fixed to sides, close to the bottom frame connectors 52, of the two side rods 513 respectively, and the middle of the long horizontal rod 511 and the middle of the short horizontal rod 512 are fixedly connected through the connecting rod 514. Specifically, rear sides of left and right ends (in the direction of the two side walls) of the lower horizontal tube 13 of the front wall 1 are each provided with a U-shaped fixing member 9 which is open backward, and front ends of the side rods 513 are riveted to the U-shaped fixing member 9 through rivets. The rear wall 2 and the other bottom frame are installed in the same way. Each bottom frame 51 has a wide end and a narrow end, that is, the long horizontal rod 511 is installed on the side where the front wall or the rear wall is located, and the short horizontal rod 512 is installed on the side where the bottom frame connectors 52 are located.

Figure 6:
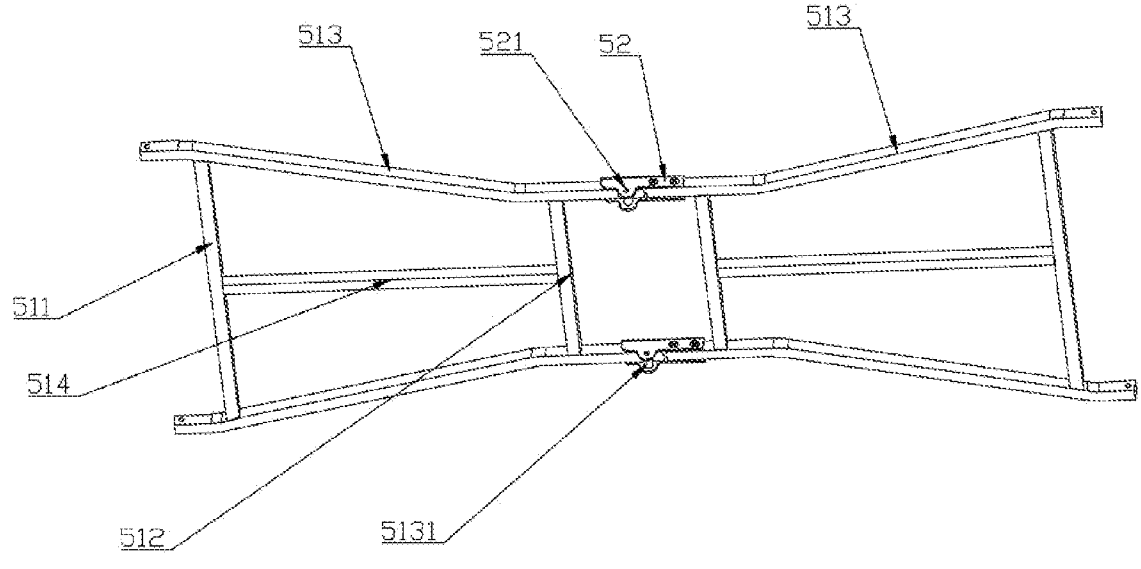
FIG. 6 is a bottom view of a chassis.

Each bottom frame connector 52 comprises a U-shaped connecting piece which is open downward, and a rivet, wherein one side of the U-shaped connecting piece is disposed around the ends of the side rods 513 of one bottom frame and is fixed through a rivet or the like, through holes 521 in a left-right direction are formed in two symmetrical walls of the other side of the U-shaped connecting piece, shaft sleeves 5131 are disposed on lower surfaces of the side rods 513 of the other bottom frame, and the rivet penetrates through the through holes 521 and the shaft sleeves 5131 to rotatably connect the U-shaped connecting piece 52 and the other bottom frame. When the short horizontal rod 512 is pulled upward or downward, the side rods of the other bottom frame is separated from or inlaid in an opening of the U-shaped connecting piece, and the two bottom frames are folded or unfolded. As shown in FIG. 4 and FIG. 6, when the two bottom frames are in an unfolded state, left and right ends of the side rods 513 of the bottom frame on the front wall side are inserted into the openings of the two U-shaped connecting pieces respectively from the front end, that is, lower surfaces of the two bottom frames face the ground. When the two bottom frames 51 are in a folded state, protrusions on left and right sides of the side rods 513 of the bottom frame on the front wall sides are separated from the openings of the two U-shaped connecting pieces 52, that is, the lower surfaces of the two bottom frames 51 draw close to each other gradually, and the cart frame is folded, as shown in FIG. 5.

End faces of the side rods 513 of the other bottom frame are slopes 5132, and as shown in FIG. 4, sides, close to the U-shaped connecting piece, of the slopes 5132 are lower than sides, away from the U-shaped connecting piece, of the slopes 5132, such that when the middle of the short horizontal rod 512 of the bottom frame is held by hand to be lifted upward, the ends of the side rods 513 of the bottom fame can be separated from the opening of the U-shaped connecting piece 52.

The wheels 4 are detachably connected to the bottom of the front wall 1 or the bottom of the rear wall 2. Specifically, the four wheels 4 can be detached from the bottoms of the four vertical tubes 11. Each wheel comprises a wheel body 41, a wheel carrier 42 and a bolt 43 which are sequentially assembled from top to bottom, wherein the bolt 43 is inserted upward into the bottom of the corresponding vertical tube 11.

The triple-crossed horizontal folding cart further comprises a cart cloth cover 6, wherein four upper edges of the cart cloth cover 6 are detachably installed on the two side walls 3, the front wall 1 and the rear wall 2 of the frame body, that is, the four upper edges of the cart cloth cover 6 are disposed in the frame body; and the bottom of the cart cloth cover 6 is in contact with the surface of the chassis 5. Two fixing pieces 62 which are open downward are disposed on each of left and right sides of the cart cloth cover 6 and are disposed around joints of the upper ends of every two cross tubes, namely the joint of the upper end of the front cross tube 31 and the upper end of the middle cross tube 32, and the joint of the upper end of the middle cross tube 32 and the upper end of the rear cross tube 33. Sleeves 61 are disposed on front and rear sides of the cart cloth cover 6, and the sleeves 31 may be structures formed by cloth pieces and hook-loop fasteners (or other detachable structures such as zippers), hook sides and loop sides of the hook-loop fasteners are disposed on inner sides of the cloth pieces and the outer wall of the cart cloth cover respectively, and the cloth pieces are turned outward to cover the middle of the U-shaped upper horizontal tubes to form the sleeves 61, and are then fixed on the outer wall of the cart cloth cover.

It should be noted that the drawings provided in the above embodiment are merely used to illustratively explain the basic concept of the invention and only show components involved in the invention, the components are not drawn according to the actual number, shape and size of the components, the form, number and proportion of the components can be changed freely during actual implementation, and the layout of the components may be more complicated. Unless otherwise stated and defined, the terms "arrange", "install" and "connect" should be broadly understood. For example, "connect" may be fixed connection, detachable connection or integrated connection; or mechanical connection or electrical connection; or direct connection, indirect connection through an intermediate medium, or internal communication of two elements. Those ordinarily skilled in the art can understand the specific meanings of these terms in the invention as the case may be.

It should be noted that the above embodiments are merely preferred ones of the invention and are used to explain the technical principle of the invention. Those skilled in the art should understand that the invention is not limited to the specific embodiments described herein, and those skilled in the art can make various changes, readjustments and substitutions without departing from the protection scope of the invention. Thus, although the invention has been described in detail with reference to the above embodiments, the invention is not limited to the above embodiments, and the invention may include more other equivalent embodiments without departing from the concept of the invention. The scope of the invention is defined by the appended claims.

What is claimed is:

1. A triple-crossed horizontal folding cart, comprising:

a cart frame;

wherein the cart frame comprises a frame body formed by a front wall, a rear wall, and two symmetrical side walls;

a chassis disposed at a bottom of the frame body;

wherein a left end and a right end of the front wall being each provided with a wheel;

wherein a left end and a right end of the rear wall being each provided with a wheel;

wherein a front end and a rear end of the chassis are rotatably connected to the front wall and the rear wall respectively;

wherein each of the side walls comprises a front cross tube, a middle cross tube and a rear cross tube all of which are rotatably connected in sequence;

wherein a first and second straight tubes of each said cross tube are rotatably connected;

wherein an upper and lower sides of the front cross tube are rotatably connected to the front wall and the chassis respectively;

wherein an upper and lower sides of the rear cross tube are rotatably connected to the rear wall and the chassis respectively;

wherein the first straight tube of the front cross tube or the rear cross tube is a a) long tube, or b) short tube, and is connected to the chassis;

the second straight tube of the front cross tube or the rear cross tube is a short tube, and is connected to the front wall or the rear wall; wherein an upper section of the long tube is riveted to the short tube;

wherein each said bottom frame comprises a long horizontal rod, a short horizontal rod and two side rods, and front and rear ends of each said side rod are connected to the front wall or the rear wall, and one said bottom frame connector respectively;

wherein two ends of the long horizontal rod are fixed to sides, close to the front wall or the rear wall, of the two side rods respectively, and two ends of the short horizontal rod are fixed to sides, close to the bottom frame connectors, of the two side rods respectively;

wherein two ends of a connecting rod are fixed to a middle of the long horizontal rod and a middle of the short horizontal rod respectively;

wherein each said bottom frame connector comprises a U-shaped connecting piece which is open downward, and a rivet, one side of the U-shaped connecting piece is disposed around and fixed at ends of the side rods of one said bottom frame, through holes in a left-right direction are formed in two symmetrical walls on the other side of the U-shaped connecting piece, shaft sleeves are disposed on lower surfaces of ends of the side rods of the other bottom frame, and the rivet penetrates through the through holes and the shaft sleeves to rotatably connect the U-shaped connecting piece and the other bottom frame; and when the short horizontal rod is pulled upward or downward, the ends of the side rods of the other bottom frame are separated from or inlaid in an opening of the U-shaped connecting piece, and the two bottom frames are folded or unfolded.

2. The triple-crossed horizontal folding cart according to claim 1, wherein the front wall comprises two vertical tubes, a U-shaped upper horizontal tube and a lower horizontal tube; wherein a first and second symmetrical bottoms of the U-shaped upper horizontal tube are riveted to the two vertical tubes respectively; and two free ends of the U-shaped upper horizontal tube are rotatably connected to said upper ends of the two front cross tubes of the two side walls; and the lower horizontal tube is fixed to said lower ends of the two vertical tubes; wherein the rear wall is identical in structure with the front wall.

3. The triple-crossed horizontal folding cart according to claim 2, further comprising a telescopic hand lever, wherein a lower end of the hand lever is rotatably connected to the lower horizontal tube.

4. The triple-crossed horizontal folding cart according to claim 1, wherein the chassis comprises two bottom frames and two bottom frame connectors, one side of one bottom frame and one side of the other bottom frame are riveted through the two bottom frame connectors, and the other side of one bottom frame and the other side of the other bottom frame are riveted to a lower end of the front wall and a lower end of the rear wall respectively.

5. The triple-crossed horizontal folding cart according to claim 1, wherein end faces of protrusions on left and right sides of the other bottom frame are slopes, and sides, close to a U-shaped connecting piece, of the slopes are lower than sides, away from the U-shaped connecting piece, of the slopes.

6. The triple-crossed horizontal folding cart according to claim 1, wherein the wheels are detachably connected to a bottom of the front wall or a bottom of the rear wall.

7. The triple-crossed horizontal folding cart according to claim 1, further comprising a cart cloth cover, wherein four upper edges of the cart cloth cover are installed on the two side walls, the front wall and the rear wall of the frame body, and a bottom of the cart cloth cover is in contact with a surface of the chassis.

* * * * *